United States Patent
Reip

[15] 3,696,837
[45] Oct. 10, 1972

[54] ELECTROMAGNETIC FLUID CONTROL VALVE

[72] Inventor: Raymond G. Reip, Clarendon Hills, Ill.

[73] Assignee: GPE Controls, Inc., Morton Grove, Ill.

[22] Filed: May 7, 1971

[21] Appl. No.: 141,137

[52] U.S. Cl. ............137/625.33, 251/129, 251/139, 251/141, 251/282
[51] Int. Cl. ............................................F16k 31/06
[58] Field of Search............251/129, 141, 139, 282; 137/625.33, 625.28, 625.37

[56] References Cited
UNITED STATES PATENTS 2,863,473   12/1958   Gantz...................251/139 X
2,964,286   12/1960   Hoskins.................251/139 X

*Primary Examiner*—Arnold Rosenthal
*Attorney*—Julian Falk and Chester A. Williams, Jr.

[57] ABSTRACT

An electromagnetic valve for controlling fluid flow in a line which includes a plug coacting with pole pieces and a coil in a magnetic circuit, and ports in the fluid circuit of the valve, wherein the plug permits or prevents fluid flow respectively in response to deenergization and energization of the coil. The ports are arranged relative the plug to effect a partial pressure balancing.

15 Claims, 8 Drawing Figures

Inventor
Raymond G. Reip
By Julian Falk
Attorney

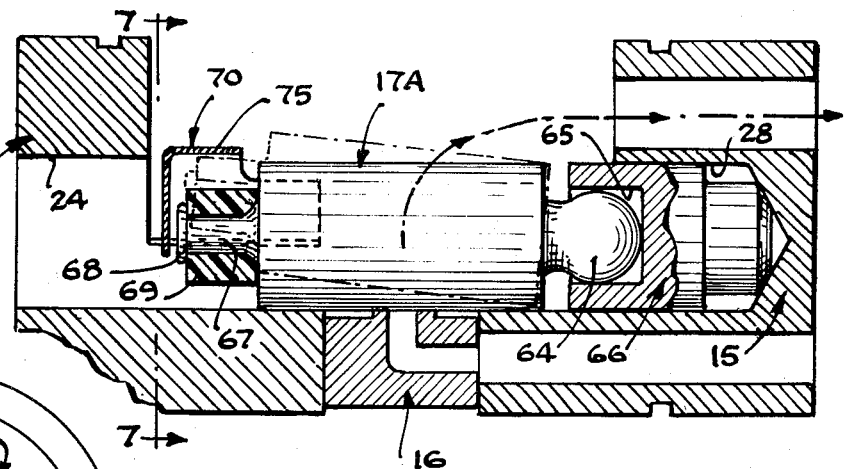
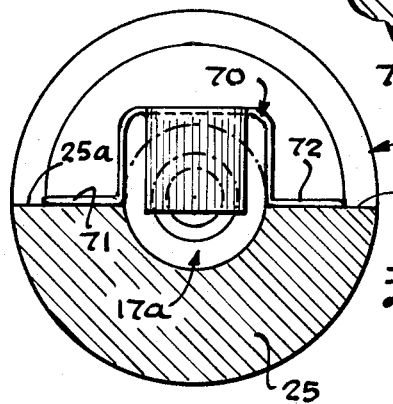
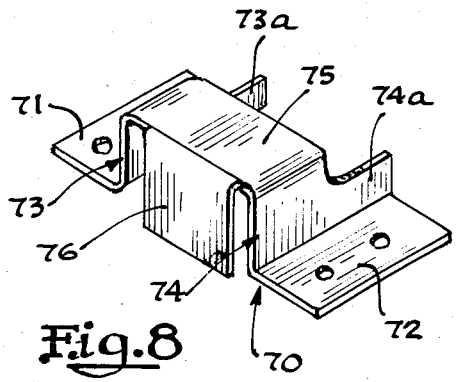
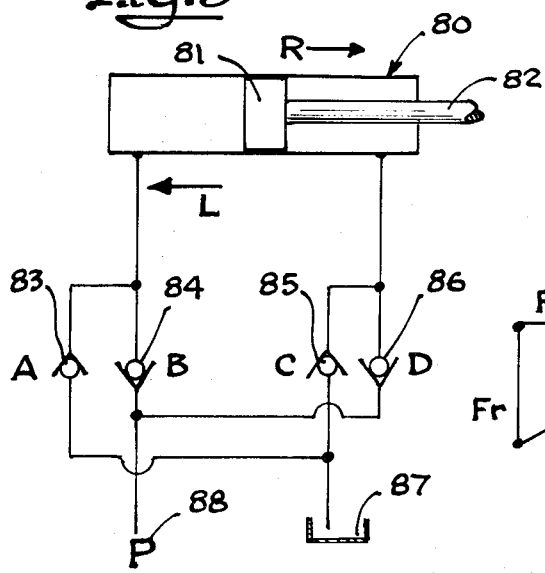
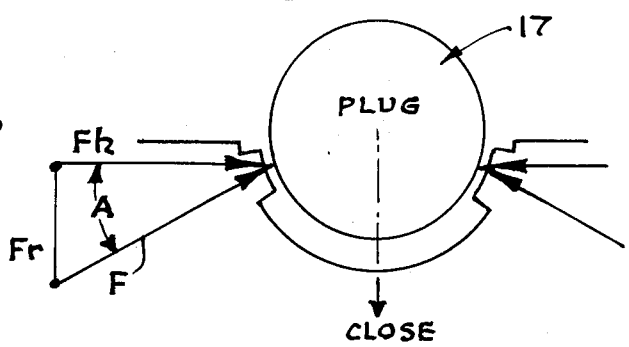

ELECTROMAGNETIC FLUID CONTROL VALVE

This invention relates in general to a valve for controlling fluid flow through a line, and more particularly to an electromagnetically operated fluid valve, and still more particularly to a valve that is especially suitable for controlling fluid flow in hydraulic circuitry.

The valve of the invention is of the small poppet type, and is unique since it incorporates pressure balancing features thereby rendering it capable of handling moderately high amounts of hydraulic power. The valve includes a tubular magnetic casing closed at the ends by opposed magnetic end plates. The term "magnetic" means magnetically permeable material, and the term "non-magnetic" means material not magnetically permeable. A coil is arranged within the casing between the end plates and in coaxial alignment with the casing. Spaced pole pieces are mounted within the coil, one against each of the end plates. A cylindrical plug extends coaxial of the coil and seats against the pole pieces to complete the magnetic circuit therebetween when the coil is energized. A non-magnetic port section is arranged between the pole pieces, and includes a pair of angularly related ports against which the plug seats when in seated position to close the ports. The ports have their axis extending substantially normal to the plug and angularly spaced by an angle greater than 90° and less than 180°, and preferably about 120°. The ports are connected to an inlet for the valve which is in turn adapted to be connected to a source of pressurized hydraulic fluid, while an outlet is provided for the valve which communicates with the side of the plug opposite the side facing the ports. When the coil is deenergized, pressurized fluid in the ports impart angular forces to the plug to move the plug away from the ports thereby causing the valve to open and allow the fluid circuit therethrough to be completed. Energization of the coil seats the plug against the pole pieces and ports by overcoming the forces generated by the pressurized fluid at the ports to thereby close the ports and interrupt the fluid circuit through the valve.

Heretofore, it has been known to employ pressure balancing in sliding spool valves and large plug type control valves by using opposed ports. However, employing partial pressure balancing in a small poppet type valve as in the present invention is believed to be unique.

In the usual solenoid valve, the port itself and the end of the plug that seats against and closes the port take all of the shock of the closing forces resulting in high wear and shortened life. In the valve of the present invention, pole pieces at both ends of the plugs define a large solid area to absorb the shock of closing forces, thereby enhancing life.

The plugs in heretofore known solenoid valves have one area on the end of the plug working against the port at all times. The plug in the valve of the present invention is free to rotate, thereby spreading the wear and erosion of the plug over a large area to increase valve life.

The plug in the valve of the invention moves laterally within the coil to close the magnetic gap between the pole piece and to close the valve port, and this arrangement has not been heretofore known.

The pole pieces of the valve according to the invention partially surround the plug, thereby generating a high magnetic closing force over a relatively long stroke. Since the pressure forces of the ports are centered between the magnetic pull through the ends of the plug and the pole pieces, they thereby give the magnetic forces a 2 to 1 advantage over the hydraulic forces. Long stroke solenoid design using a tapered plug and seat arrangement is common knowledge, but the application of the long stroke principle in the unique valve configuration of the present invention is believed to be new.

An example of use of the present invention would be to replace a four-way hydraulic control valve and shut-off valve in a hydraulic circuit operating a double acting hydraulic cylinder, wherein four valves according to the present invention are substituted for the four-way hydraulic control valve and the shut-off valve. The cost of the valve system in accordance with the present invention would be much less than that of heretofore known valving systems. This is partly due to the simple construction of the valve of the present invention and partly due to the elimination of a separate shut-off valve inasmuch as the valves of the present invention can handle the function of a shut-off valve.

It is therefore an object of the invention to provide a new and improved electromagnetic valve for controlling fluid flow in fluid circuits, and especially for controlling fluid flow in hydraulic circuitry.

Another object of the present invention is in the provision of an electromagnetic poppet type valve for controlling fluid flow in a line.

Still another object of the invention is to provide an electromagnetic fluid control valve that is simple and economical in construction, and which is capable of extremely long cycle life, and which has low leakage characteristics.

A still further object of the invention resides in the provision of an electromagnetic poppet type of valve for controlling fluid flow in hydraulic circuitry, and which is capable of handling moderately high amounts of hydraulic power.

Still another object of the invention is to provide an electromagnetic fluid control valve of the small poppet type which utilizes partial pressure balancing.

A still further object of the present invention is to provide an electromagnetic valve of the small poppet type including a plug movable laterally within a coil to close a magnetic gap and valve port arrangement.

Another object resides in the provision of an electromagnetic valve for controlling fluid flow in a line which includes a cylindrical plug coacting with spaced pole pieces to complete a magnetic circuit and with a pair of angularly related ports, wherein the plug is free to rotate thereby spreading the wear over a large area and enhancing valve life, and wherein the valve acts like a check valve to prevent backflow therethrough.

Other objects, features and advantages of the invention will be apparent from the following detailed disclosure, taken in conjunction with the accompanying sheets of drawings, wherein like reference numerals refer to like parts, in which:

FIG. 4 is a force diagram illustrating the partial pressure balancing feature of the invention;

FIG. 5 is a hydraulic schematic diagram of a hydraulic system operating a fluid cylinder and utilizing the valves of the present invention;

FIG. 6 is a sectional view taken through a modified plug arrangement of the invention, it being understood that only the pole pieces, port section and plug are illustrated, and it being understood that the plug is shown in solid and dotted lines to depict working operation;

FIG. 7 is a sectional view taken substantially along line 7—7 of FIG. 6; and

FIG. 8 is a perspective view of the guide and stop element utilized in the embodiment of FIG. 6.

Figure 1:
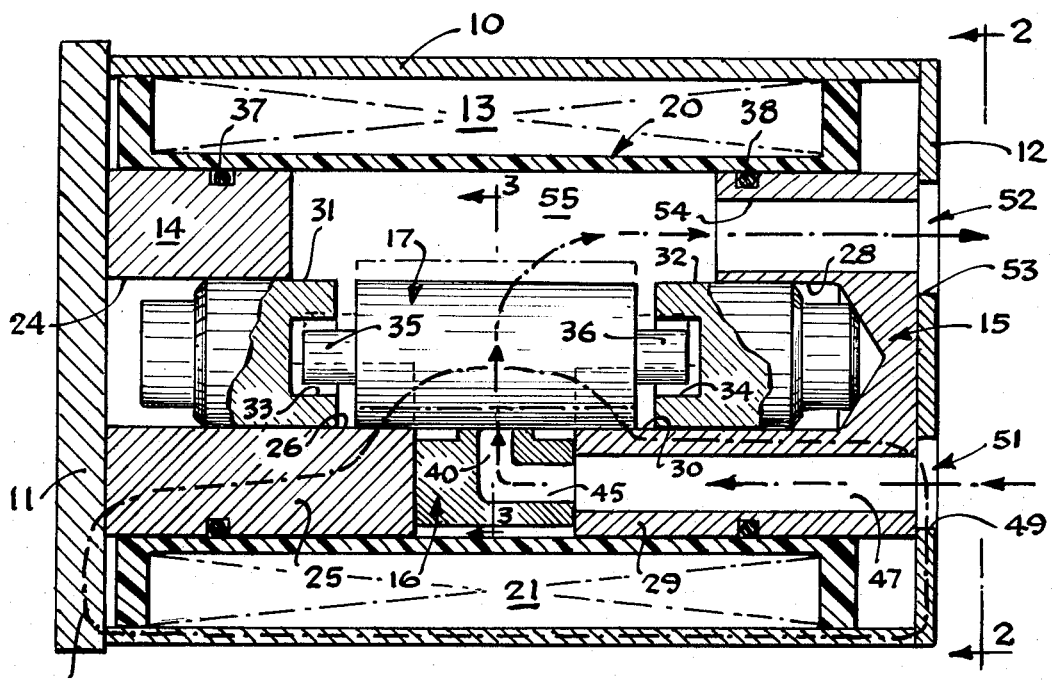
FIG. 1 is an angular sectional view taken through a valve according to the invention, with some parts broken away and others shown in elevation for purposes of clarity, and showing the valve plug in solid and phantom lines to illustrate working positions.
Figure 3:
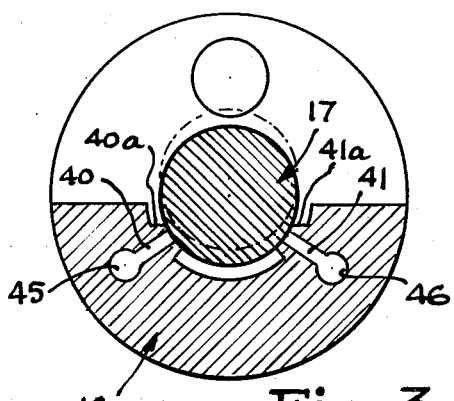
FIG. 3 is a transverse sectional view taken substantially along line 3—3 of FIG. 1.

Referring now to the drawings, and particularly to FIGS. 1 and 3 which illustrate one embodiment of the invention, the electromagnetic valve of the invention includes generally a magnetic tubular casing 10 which is cylindrical in shape, magnetic end plates 11 and 12 closing the opposite ends of the casing, a coil 13 arranged with the casing between the end plates, first and second magnetic pole pieces 14 and 15 positioned within the coil at opposite ends and respectively against the end plates 11 and 12, a non-magnetic port section 16 fastened between the spaced pole pieces 14 and 15, and a magnetic plug or armature 17 coacting with the pole pieces and the port section. As seen particularly in FIGS. 1 and 3, the plug 17 as shown in solid lines is in the closed position when the coil is energized, and as shown in phantom or dotted lines is in the open position when the coil is deenergized.

The coil 13 is shown as including a cylindrical bobbin 20 of a suitable insulating material, flanged at the ends and wound with the standard magnet wire 21, it being appreciated that the coil is of a type that is well known, and which defines a hollow central area or chamber within which the pole pieces, plug and port section are arranged. The coil is coaxially positioned relative the casing 10, and essentially extends between the end plates 11 and 12.

The first and second pole pieces 14 and 15 are essentially formed to be identical, and to be positioned in the coil in opposed relation, with the one exception that fluid passageways are formed in the second pole piece 15. Referring particularly to the first pole piece 14, it is formed as a cylinder having a bore 24 extending therethrough, and a substantially one-half round extension 25 on the end adjacent the plug 17 to substantially wrap around the plug, and to form a substantially one-half round seat 26 against which one end of the plug seats when the coil is in energized condition. Similarly, the second pole piece 15 is cylindrically shaped but provided with a blind bore 28 coaxial therewith and opening toward the plug. The pole piece is similarly provided with a one-half round extension 29 defining a seat 30 against which the adjacent end of the plug abuts when the coil is energized.

In order to limit the movement of the plug away from the pole piece seats when the coil is deenergized, restraining blocks 31 and 32 are suitably received in the bores 24 and 28, and provided with blind bores or vertical slots 33 and 34 to receive diametrically reduced extensions 35 and 36 extending from the opposite ends of the plug 17. The bores or slots 33 and 34 are somewhat wider than diametrically reduced portions 35 and 36 to provide freedom of movement of the plug, but to limit the movement of the plug away from the pole piece seats and the port section. O-ring gaskets 37 and 38 are provided in suitable peripheral grooves on the pole pieces 14 and 15, thereby being interposed between the pole pieces and the bobbin of the coil 13 to prevent leakage of fluid therebetween.

The non-magnetic port section 16 is essentially one-half round like the extensions 25 and 29 on the pole pieces, and as seen in FIG. 3, is provided with angularly related ports 40 and 41 terminating in port seats 40A and 41A against the plug 17 seats when in seated relation with the pole pieces, thereby closing off the ports. Accordingly, when the coil is energized, the plug 17 takes the position shown in solid lines in FIGS. 1 and 3 to close the ports wherein the valve functions as a shutoff valve. Also, when the coil is deenergized and fluid flow is attempting to back up through the valve, it will force the plug into seated position wherein the valve operates as a check valve. The ports 40 and 41 while extending angularly to each other and along a single radial plane, extend perpendicular to the axis of the plug 17. The angle at which the ports extend relative to each other is greater than 90° and less than 180° and is about 120°. As seen in the diagram of FIG. 4, the ports, when fed by a source of pressurized fluid exert a force F against the plug which has a vertical component $Fv$ and a horizontal component $Fh$. The horizontal components of the ports 40 and 41 cancel each other leaving only the vertical components which urge the plug away from the ports when the coil is deenergized. Since the angle A of the port hydraulic force relative the horizontal can be about 30°, the forces which oppose the electromagnetic closing force are only about one-half of what they would be with a single port of equivalent flow capacity. This pressure balancing feature enables the valve of the invention to handle higher amounts of hydraulic power. Thus, the hydraulic forces, due to the pressure at the ports 40 and 41 when closed or the flow forces when open, act against the plug 17 on both sides thereof at an angle.

Inlet means are provided to the ports 40 and 41 which include short passageways 45 and 46 for the ports 40 and 41 which extend perpendicular to the port axis, and which connect with aligned passageways 47 and 48 formed in the pole piece 15, which in turn communicate with openings 49 and 50 in the end plate 12. As illustrated, the passageways 47 and 48 are larger than the passageways 45 and 46, and the openings 49 and 50 are larger than the passageways 47 and 48. Thus, an inlet 51 is defined for the valve which is adapted to be connected to a source of pressurized fluid.

An outlet 52 is defined by an opening 53 and the end plate 12 which aligns with the passageway 54 formed in the second pole piece 15 that communicates with a chamber 55 formed with the coil 13. The volumetric capacity of the outlet is equal to or greater than that of the inlet. The normal flow of fluid through the valve when the coil is deenergized is shown by the arrows, wherein the fluid flow goes through the inlet 51, out the ports 40 and 41 and out the outlet 52.

Figure 2:
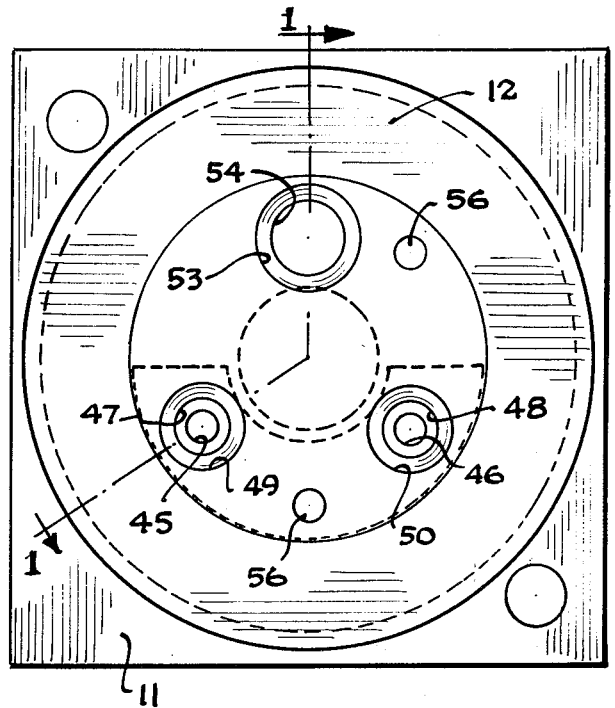
FIG. 2 is an end view of a valve of FIG. 1 and looking along line 2—2 thereof.

The end plates 11 and 12 are held against the pole pieces 14 and 15, and the entire valve is mounted to a support with connecting passages by suitable fasteners (not shown) such as bolts which would extend longitudinally through the valve, it being noted that bolt holes 56 are shown in the end plate 11, FIG. 2.

It can be seen that the plug 17 when in seated position overlies the gap defined between the pole pieces 14 and 15 and completes the magnetic circuit therebetween, the path of magnetic flux being illustrated by the broken line 60. The magnetic pull is applied to the ends of the plug, and with the hydraulic ports being in the center, provides a magnetic force with a 2 to 1 advantage over the hydraulic force. The energization of the coil causes one end of the plug to be pulled in at a time pivoting about the other end of a plug. It will be appreciated that since the pole pieces partially envelop or surround the plug, a high magnetic closing force is provided over a relatively long stroke.

Another form of mounting and limiting movement of the plug is shown in FIGS. 6 to 8, the plug being here designated as 17A. The pole pieces 14 and 5, and the port section 16 are identical to those in the first embodiment, and accordingly, the same reference numerals are applied. The coil, casings, and end plates have been omitted for purposes of clarity inasmuch as they are no different than those in the embodiment of FIG. 1. At one end of the plug 17A, a ball 64 is provided which is received in a socket 65 of a bearing 66 held by the blind bore 28 of the pole piece 15. Thus, the plug 17A is pivotally mounted at the end adjacent the pole piece 15 by the ball and socket arrangement.

The other end of the plug 17A has extending therefrom a stub shaft 67 terminating at its free end in a flange 68. A sleeve or tube 69 of resilient plastic is received over the stub shaft 67 and held on by the flange 68 to act as a bumper. A combination stop and guide bracket 70 mounted on the pole piece 14 coacts with the resilient sleeve and the body of the plug to limit swinging movement of the plug away from the seated position and to prevent any lateral movement of the plug.

The bracket 70 includes opposed mounting flanges 71 and 72 which are suitably secured to the spaced horizontal extending faces 25a and 25b formed on the extension 25. Vertical walls 73 and 74 extend upwardly from the mounting flanges 71 and 72, and at one end are joined by a cross bar 75 that acts as a stop to coact with the bumper 69 and restrict pivotal movement of the plug 17A. The bumper 69 when striking the stop cushions the plug against undue shock, thereby enhancing its life.

The stop 75 extends from the front edge, looking at FIG. 8, rearwardly to about midway of the longitudinal length of the wall 74 in order to allow clearance for the plug body to move upwardly. The rear ends 73a and 74a of the walls 73 and 74 function to guide the pivotal movement of the plug 17A along a rectilinear path, thereby preventing lateral movement of the plug. In order to prevent the plug 17A from moving endwise out of the ball socket 65, a vertically extending stop 76 is provided on the bracket and which extends downwardly from the forward edge of the horizontal stop 75. In FIG. 6, the plug 17A is shown seated in closed position in solid lines and pivotally moved to its open position in phantom.

An example of use for the valve of the present invention is illustrated in FIG. 5 in the control of a double acting hydraulic cylinder 80. A piston 81 in the cylinder, upon being subjected to hydraulic fluid forces, delivers power through the piston rod 82 to a suitable device. Heretofore, a four-way hydraulic spool valve and shut-off valve would be used to control operation of such a cylinder. Four of the small valves according to the present invention, are employed in place of the spool valves and shut-off valve to obtain the full control of the cylinder, these valves being designated as 83, 84, 85 and 86. The outlet end of valve 83 and the outlet end of valve 85 are connected to the reservoir 87, while the inlet of valve 83 is connected to one end of the cylinder 80 and the inlet of the valve 85 is connected to the other end of the cylinder. The inlet of valves 84 and 86 are connected to pump 88, while the outlet of valve 84 is connected to one end of the cylinder and the outlet of valve 86 is connected to the other end of the cylinder. In operation, to move the piston 81 to the right in the cylinder, valves 83 and 86 are energized and therefore closed, while valves 84 and 85 are deenergized and therefore open. To move the piston 81 to the left, valves 83 and 86 are deenergized and therefore open, while valves 84 and 85 are energized and therefore closed. To completely close and shut off the hydraulic circuit to hold the piston in any particular location, all valves are energized, and therefore closed.

It will be understood that modifications and variations may be effected without departing from the scope of the novel concepts of the present invention, but it is understood that this application is to be limited only by the scope of the appended claims.

This invention is hereby claimed as follows:

1. An electromagnetic valve for controlling fluid flow in a line comprising, a magnetic tubular casing, opposed magnetic end plates at each end of the casing closing the ends, a coil within said casing between the end plates and against the casing, first and second spaced magnetic pole pieces within the coil and against the opposed end plates, a non-magnetic port section within the coil and between said pole pieces, a cylindrical magnetic plug within the coil coacting with the pole pieces to complete the magnetic circuit therebetween and to seat thereagainst when the coil is energized, a pair of ports in the port section angularly related to each other and extending substantially normal to the axis of the plug, the ports being closed by the plug when the coil is energized to prevent fluid flow through the valve, inlet means communicating with the ports and adapted to be connected to a source of pressurized fluid, and outlet means communicating with the side of the plug away from the ports, wherein fluid flow back through the valve when the coil is deenergized and when the source of pressurized fluid is lost is prevented as such causes the plug to seat and close the ports.

2. An electromagnetic valve as defined in claim 1, wherein the angle between the ports is greater than 90° and less than 180°.

3. A electromagnetic valve as defined in claim 1, wherein the angle between the ports is about 120°.

4. An electromagnetic valve as defined in claim 1, wherein the pole pieces are arcuate and partially surround the plug.

5. An electromagnetic valve as defined in claim 1, wherein the plug in seated position against the pole pieces and ports is substantially coaxially aligned with the coil.

6. An electromagnetic valve as defined in claim 1, and means for limiting the movement of the plug away from the ports.

7. An electromagnetic valve as defined in claim 6, wherein said means includes coacting means on the opposite ends of the plug and on the pole pieces.

8. An electromagnetic valve as defined in claim 7, wherein said coacting means includes diametrically reduced extensions at opposite ends of the plug freely received in restraining sockets of the pole pieces of larger dimensions than the extension.

9. An electromagnetic valve as defined in claim 7, wherein said coacting means includes a ball extension at one end of the plug pivotally received in a socket on one of the pole pieces, and a projection at the other end of the plug coacting with a stop on the other of the pole pieces permitting a limited movement away from the pole piece.

10. An electromagnetic valve as defined in claim 9, and resilient means on said projection damping the striking of the projection against the stop.

11. An electromagnetic valve as defined in claim 10, and guide means on the other of the pole pieces guiding movement of the plug away from the pole piece along a rectilinear path.

12. An electromagnetic valve as defined in claim 9, wherein the angle between the ports is greater than 90° and less than 180°, and the pressurized fluid in the ports forces the plug away from the ports to open the valve when the coil is deenergized.

13. A valve for controlling fluid flow in a line comprising, first and second spaced pole pieces, a port section of non-magnetic material between the pole pieces having first and second angularly related ports, inlet means to the ports adapted to be connected to a pressurized fluid source, a coil surrounding the pole pieces and port section, a cylindrical plug extending between the pole pieces over said ports and movable relative the pole pieces and the ports to seat thereagainst and close the ports when the coil is energized, and outlet means arranged relative the plug and ports to prevent fluid flow from the outlet means through the ports.

14. A valve for controlling fluid flow in a line comprising, a magnetic tubular casing closed at both ends by magnetic end plates, a coil within the casing extending coaxial therewith, first and second spaced magnetic pole pieces within said coil, a non-magnetic port section between said pole having a pair of angularly related ports, inlet means to said ports adapted to be connected to a pressurized fluid source, a cylindrical plug within the coil coacting with said pole pieces to complete the magnetic circuit therebetween and to open and close the ports upon respective deenergization and energization of the coil, and outlet means communicating with the plug.

15. An electromagnetic valve for controlling fluid flow in a line comprising, a valve body having an inlet and an outlet, a non-magnetic port section having a pair of ports terminating in valve seats, a cylindrical magnetic valve closure member coacting with the ports to open and close same, a pair of spaced magnetic pole pieces defining seats for the opposite ends of the closure member, one pole piece on each side of the port section wherein the closure member completes the magnetic circuit between the pole pieces, a coil surrounding the pole pieces, port section and closure member, a magnetic casing enclosing said coil and closed at opposite ends by magnetic end plates, and the fluid flow axes of said ports being coplanar, transverse the closure member, and radially spaced more than 90° and less than 180°.

* * * * *